United States Patent
Dechu et al.

(10) Patent No.: US 10,367,645 B2
(45) Date of Patent: Jul. 30, 2019

(54) PROOF-OF-WORK FOR SMART CONTRACTS ON A BLOCKCHAIN

(71) Applicant: International Business Machines Corporation, Armonk, NY (US)

(72) Inventors: Sampath Dechu, Bangalore (IN); Ramachandra Kota, Bangalore (IN); Pratyush Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/334,728

(22) Filed: Oct. 26, 2016

(65) Prior Publication Data
US 2018/0115425 A1    Apr. 26, 2018

(51) Int. Cl.
*H04L 29/06* (2006.01)
*H04L 9/32* (2006.01)

(52) U.S. Cl.
CPC ........ *H04L 9/3239* (2013.01); *H04L 2209/38* (2013.01)

(58) Field of Classification Search
CPC .............................. H04L 9/3228; H04L 9/0637
See application file for complete search history.

(56) References Cited

U.S. PATENT DOCUMENTS

| | | | | |
|---|---|---|---|---|
| 7,210,169 | B2 * | 4/2007 | Smith .................... | H04L 63/083 709/228 |
| 7,356,696 | B1 * | 4/2008 | Jakobsson ............. | H04L 9/3218 713/168 |
| 9,608,829 | B2 * | 3/2017 | Spanos .................. | H04L 9/3297 |
| 9,774,578 | B1 * | 9/2017 | Ateniese ............... | G06F 3/0619 |
| 9,807,092 | B1 * | 10/2017 | Gutzmann .......... | H04L 63/1458 |
| 9,853,819 | B2 * | 12/2017 | Truu ...................... | H04L 9/3247 |
| 9,961,050 | B2 * | 5/2018 | Gvili ................... | H04L 63/0428 |
| 9,965,628 | B2 * | 5/2018 | Ford ..................... | G06F 21/554 |
| 9,967,333 | B2 * | 5/2018 | Chen ..................... | H04L 67/104 |
| 9,967,334 | B2 * | 5/2018 | Ford ..................... | H04L 67/1044 |
| 9,973,341 | B2 * | 5/2018 | Ferrin ................... | H04L 9/3247 |
| 10,075,298 | B2 * | 9/2018 | Struttmann ............. | G06F 21/64 |
| 10,116,693 | B1 * | 10/2018 | Robinson ............ | H04L 63/1458 |
| 2003/0050943 | A1 * | 3/2003 | Ikeda ...................... | G06F 7/588 708/3 |
| 2005/0198091 | A1 * | 9/2005 | Saito ...................... | G06F 7/588 708/250 |

(Continued)

FOREIGN PATENT DOCUMENTS

WO    2015175722 A1    11/2015

OTHER PUBLICATIONS

Sebastian Feld, Mirco Schonfeld, Martin Werner, Analyzing the deployment of Bitcoin's P2P network under an AS-level perspective, Elsevier, 2014.*

(Continued)

*Primary Examiner* — David Garcia Cervetti
(74) *Attorney, Agent, or Firm* — Proactive Patents LLC

(57) ABSTRACT

A blockchain configuration may be used to store a distributed ledger for information security and accessibility. One example method of operation may include determining a proof-of-work via a device and using a predefined set of nonce values when determining the proof-of-work, storing the proof-of-work on a blockchain, and broadcasting the proof-of-work as a broadcast message.

17 Claims, 5 Drawing Sheets

(56) References Cited

U.S. PATENT DOCUMENTS

| | | | | |
|---|---|---|---|---|
| 2007/0156798 | A1* | 7/2007 | Saito | G06F 7/588 708/250 |
| 2007/0247367 | A1* | 10/2007 | Anjum | H04W 64/00 342/464 |
| 2007/0271320 | A1* | 11/2007 | Tsuyuzaki | G06F 7/588 708/251 |
| 2008/0277470 | A1* | 11/2008 | Gallaher | G07C 13/00 235/386 |
| 2010/0031315 | A1* | 2/2010 | Feng | G06F 21/554 726/3 |
| 2011/0041178 | A1* | 2/2011 | Jakobsson | G06F 21/566 726/22 |
| 2011/0041180 | A1* | 2/2011 | Jakobsson | G06F 21/56 726/23 |
| 2011/0231913 | A1* | 9/2011 | Feng | G06F 21/46 726/7 |
| 2012/0317136 | A1* | 12/2012 | Papish | G06F 16/9535 707/769 |
| 2013/0024933 | A1* | 1/2013 | Jakobsson | G06F 21/567 726/22 |
| 2013/0024936 | A1* | 1/2013 | Jakobsson | G06F 21/554 726/23 |
| 2013/0215115 | A1* | 8/2013 | Jenkins | G06T 15/20 345/420 |
| 2015/0134966 | A1* | 5/2015 | Wallrabenstein | H04L 63/0853 713/174 |
| 2015/0332283 | A1* | 11/2015 | Witchey | G06Q 30/018 705/3 |
| 2016/0028552 | A1* | 1/2016 | Spanos | H04L 9/3297 713/178 |
| 2016/0218879 | A1* | 7/2016 | Ferrin | H04L 9/3247 |
| 2016/0261685 | A1* | 9/2016 | Chen | H04L 67/104 |
| 2016/0261690 | A1* | 9/2016 | Ford | H04L 67/1044 |
| 2016/0299918 | A1* | 10/2016 | Ford | G06F 21/645 |
| 2016/0301531 | A1* | 10/2016 | Finlow-Bates | G06F 21/33 |
| 2016/0330034 | A1* | 11/2016 | Back | G06Q 20/06 |
| 2016/0342977 | A1* | 11/2016 | Lam | G06Q 20/02 |
| 2016/0379212 | A1* | 12/2016 | Bowman | G06Q 20/38215 705/71 |
| 2017/0011460 | A1* | 1/2017 | Molinari | G06Q 40/04 |
| 2017/0031676 | A1* | 2/2017 | Cecchetti | G06F 8/65 |
| 2017/0033932 | A1* | 2/2017 | Truu | H04L 9/3247 |
| 2017/0091750 | A1* | 3/2017 | Maim | H04L 9/3236 |
| 2017/0116693 | A1* | 4/2017 | Rae | G06F 21/64 |
| 2017/0200147 | A1* | 7/2017 | Ansari | G06Q 20/349 |
| 2017/0206382 | A1* | 7/2017 | Rodriguez De Castro | G06F 21/76 |
| 2017/0222814 | A1* | 8/2017 | Oberhauser | H04L 9/3247 |
| 2017/0222878 | A1* | 8/2017 | Jacquin | H04L 41/28 |
| 2017/0237569 | A1* | 8/2017 | Vandervort | H04L 9/3247 713/171 |
| 2017/0237570 | A1* | 8/2017 | Vandervort | H04L 63/0442 713/176 |
| 2017/0243176 | A1* | 8/2017 | Hanke | G06Q 20/0655 |
| 2017/0243193 | A1* | 8/2017 | Manian | G06Q 20/3829 |
| 2017/0249482 | A1* | 8/2017 | Takaai | H04L 9/3236 |
| 2017/0300627 | A1* | 10/2017 | Giordano | G16H 10/60 |
| 2017/0300978 | A1* | 10/2017 | Narasimhan | G06Q 30/0279 |
| 2017/0331803 | A1* | 11/2017 | Parello | G06F 21/44 |
| 2017/0345011 | A1* | 11/2017 | Salami | G06Q 20/42 |
| 2017/0345019 | A1* | 11/2017 | Radocchia | G06Q 30/018 |
| 2017/0358041 | A1* | 12/2017 | Forbes, Jr. | B60L 53/68 |
| 2017/0359374 | A1* | 12/2017 | Smith | G06F 21/57 |
| 2017/0364700 | A1* | 12/2017 | Goldfarb | G06F 21/64 |
| 2017/0364701 | A1* | 12/2017 | Struttmann | G06F 21/78 |
| 2017/0366353 | A1* | 12/2017 | Struttmann | G06F 21/64 |
| 2018/0013567 | A1* | 1/2018 | Davis | H04L 9/0637 |
| 2018/0025365 | A1* | 1/2018 | Wilkinson | G06Q 10/08 705/7.29 |
| 2018/0039667 | A1* | 2/2018 | Pierce | G06Q 20/0658 |
| 2018/0088928 | A1* | 3/2018 | Smith | H04L 67/34 |
| 2018/0089436 | A1* | 3/2018 | Smith | G06F 21/575 |
| 2018/0089683 | A1* | 3/2018 | Setty | H04L 63/12 |
| 2018/0096042 | A1* | 4/2018 | Kuzma | H04L 9/3236 |
| 2018/0097779 | A1* | 4/2018 | Karame | G06Q 20/065 |
| 2018/0102013 | A1* | 4/2018 | Spanos | G06F 21/64 |
| 2018/0117447 | A1* | 5/2018 | Tran | G06Q 20/00 |
| 2018/0123882 | A1* | 5/2018 | Anderson | H04L 41/0813 |
| 2018/0152442 | A1* | 5/2018 | Buldas | H04L 9/3247 |

OTHER PUBLICATIONS

Nicholas Roth, An Architectural Assessment of Bitcoin Using the Systems Modeling Language, Elsevier, 2015.*

Sleiman et al., Bitcoin Message: Data Insertion on a Proof-of-Work Cryptocurrency System, IEEE, 2015.*

Carlos Pinzon, Camilo Rocha, Double-spend Attack Models with Time Advantange for Bitcoin, Elsevier, 2016.*

Preston Miller, The cryptocurrency enigma, Digital Forensics, 2016, doi:10.1016/B978-0-12-804526-8.00001-0.*

Gobel et al., Bitcoin blockchain dynamics: The selfish-mine strategy in the presence of propagation delay, Elsevier, Jul. 20, 2016.*

Kosba et al. Hawk: The blockchain model of cryptography and privacy-preserving smart contracts. Cryptology ePrint Archive, Report 2015/675, 2015. http://eprint. iacr. org, 201.

Buterin, "A next-generation smart contract and decentralized application platform." White Paper (2014).

Vukolic, "The quest for scalable blockchain fabric: Proof-of-work vs. BFT replication." Open Problems in Network Security. Springer International Publishing, 2015. 112-125.

Bonneau et al., "SoK: Research Perspectives and Challenges for Bitcoin and Cryptocurrencies" 2015 IEEE Symposium on Security and Privacy.

Courtois et al., "Optimizing sha256 in bitcoin mining" Cryptography and Security Systems. Springer Berlin Heidelberg, 2014. 131-144.

* cited by examiner

300

350

PROOF-OF-WORK FOR SMART CONTRACTS ON A BLOCKCHAIN

TECHNICAL FIELD

This application relates to using proof-of-work operations, and more particularly, to using values to determine a proof-of-work scheme.

BACKGROUND

In a blockchain configuration, a large amount of information is related to financial transactions. As the popularity of the blockchain configuration continues to increase so does the desire to implement additional functions on the blockchain. For example, when determining information on the blockchain for smart contracts, the values used to calculate the information may be derived based on a particular random set of values. However, it may be optimal to use values which are based on other known sources of information.

SUMMARY

One example embodiment may include a method that includes one or more of determining a proof-of-work via a device, using a predefined set of nonce values when determining the proof-of-work, storing the proof-of-work on a blockchain, and broadcasting the proof-of-work as a broadcast message Another example embodiment may include an apparatus that includes one or more of a processor configured to determine a proof-of-work via a device, use a predefined set of nonce values when the proof-of-work is determined, store the proof-of-work on a blockchain, and a transmitter configured to broadcast the proof-of-work as a broadcast message.

Yet another example embodiment may include a non-transitory computer readable medium configured to store instructions that when executed causes a processor to perform one or more of determining a proof-of-work via a device, using a predefined set of nonce values when determining the proof-of-work, storing the proof-of-work on a blockchain, and broadcasting the proof-of-work as a broadcast message.

DETAILED DESCRIPTION

Figure 1:
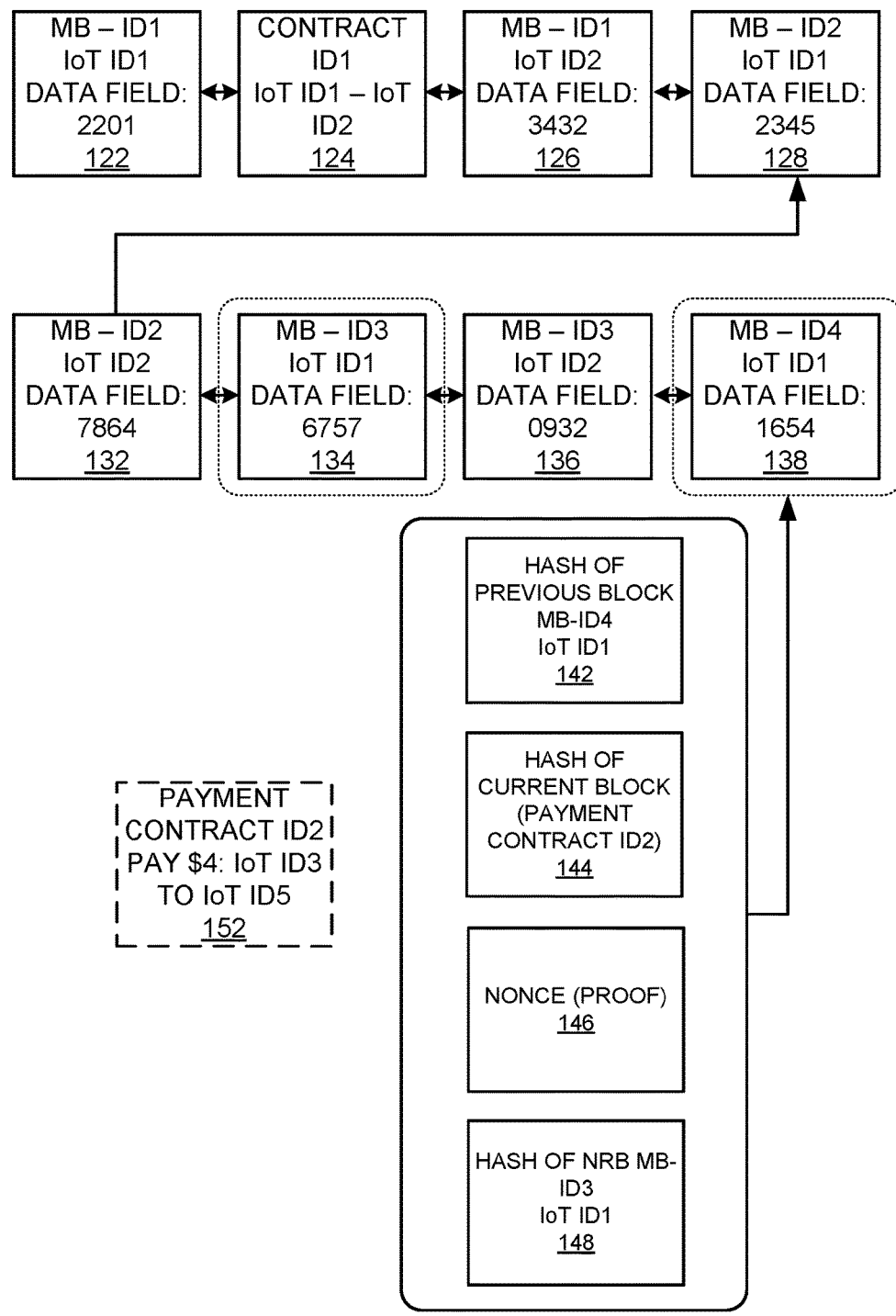
FIG. 1 illustrates a logic diagram of determining a proof-of-work for a device using a specified nonce according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure, configured to be executed by a processor, which provides an enhanced Proof-of-Work (PoW) scheme for smart contracts. A PoW includes data that is generated based on requirements of a blockchain. Generating a PoW is often measured in terms of the amount of computing resources required to perform the PoW. Producing a PoW can be a random process with low probability so that a certain amount of trial and error can be needed before a valid PoW is generated. The PoW is based on blockchain transaction data that is modified into a valid hash. Adding integer value data to the end of the hash is referred to as a 'nonce'.

In one example, the smart contracts may be created in an Internet of Things (IoT) network with IoT compatible devices. In general, any IoT device while computing a proof-of-work is conventionally restricted to use only a specific set of values for a nonce. In cryptography, a nonce is an arbitrary number that may only be used once and is often a random or pseudo-random number. A set of values could be derived from other known attributes in the blockchain. For example, values may be derived from "eligible measurement blocks" (EMB) which are a subset of measurement blocks associated with an IoT device. The subset of EMBs can be selected based on various criteria. In one embodiment, the derivations of a nonce are based on predefined "data to nonce transformations" (D2N transformations) on specific predefined "data fields" in the EMBs. When broadcasting the PoW, the IoT device will identify the "nonce reference block" (NRB) from which the nonce was derived. The IoT network verifies that the NRB is a member of the EMBs of that IoT device. The EMBs, data fields, and the data to nonce transformations are defined such that across IoT devices on a network, the size of a valid set of nonce values is approximately the same. In this example, the complexity of constructing a PoW can be adjusted dynamically, such that there is no incentive for any IoT device to use computing power beyond a determined threshold to increase its chances of a successful completion of a PoW.

IoT networks implement smart contracts, such as peer to peer (P2P) energy networks, logistic networks, crowd-sourced weather networks, and the like. Most IoT devices are constrained in the amount of energy they can consume. To enable such low-power devices to compute proof-of-work for smart contracts, the complexity of a crypto-effort or crypto-puzzle should be reduced. However, reduction in the complexity of the crypto-puzzle can enable malicious participants to manipulate the smart contracts. Modifying the conventional proof-of-work scheme to avoid such manipulation in IoT networks may include various operations to reduce the complexity of solving a crypto-puzzle. In one embodiment, the scheme does not depend on the nature of smart contracts or modifying the smart contract contents.

Enhancing the computational capacity of IoT devices should not increase the chances of a successful completion of a proof-of-work with respect to other IoT devices. The scheme should provide equal chances of successful completion of proof-of-work to all IoT devices in the network. In general, IoT devices measure network data that is relevant to settling smart contracts (e.g., energy measurements in P2P energy networks based on a period of time, such as minutes or hours). To enforce smart contracts on the blockchain, the data is logged on the blockchain as part of a unit of measure, such as one or more measurement blocks. Each IoT device generates a series of such measurement blocks over time. As a result, this data is publicly accessible, trusted, and uniquely associated with measuring an IoT device. For an IoT device, the series of data can exhibit variability over time (e.g., changing energy consumption in P2P energy networks, product codes in logistics network, etc.). Variability of the data is also exhibited across all IoT devices. In typical smart contracts, IoT devices can use any randomly generated nonce to compute a proof-of-work. However, according to example embodiments, the IoT devices are restricted to use certain known values as the nonce for hash completion and PoW determinations. The values are the result of D2N transformations on a specific data field in EMBs of a particular IoT device.

To establish a consensus on validity, while submitting a proof-of-work, the IoT device provides a NRB as part of a new block. The eligibility of a NRB is verified by other devices in the network, in addition to verifying a correctness of a transaction as performed in existing protocols. As a number of IoT devices in the network becomes larger and the rate of new measurements is high, there will be enough data points to act as nonces across the network for any new block. For instance, if the number of IoT devices=1,000,000, and a rate of measurements=hourly, then the EMBs=last 24 hours of the overall measurement block (MBs) yields a total number of nonce choices=24 million. The D2N transformations are such that the derived nonces are uncorrelated. IoT device computational power/capacity is capable of checking the crypto-puzzle with a limited set of nonce values within the time interval taken by the network on average to insert a new block. Since, for a particular IoT device, the number of options for a nonce is limited (e.g., 24 million), increasing the computation power will not increase the chances of successful computation of proof-of-work.

Any IoT device while computing a proof-of-work is restricted to use only a specific set of values for a nonce. The set of values are derived from "eligible measurement blocks" (EMB) which are subset of the measurement blocks associated with the IoT device. The derivations of nonce are based on predefined "data to nonce transformations" (D2N transformations) performed on specific predefined "data fields" in the EMBs. When broadcasting the proof-of-work, the IoT device has to identify the "nonce reference block" (NRB) from which the nonce was derived. The IoT network verifies that the NRB is a member of EMBs of that IoT. The EMBs, data fields, and the data to nonce transformations are defined such that, across IoT devices, the size of a valid set of a nonce is approximately the same. The complexity of the constructing proof of work can be adjusted, such that there is no incentive for any IoT device to use computing power beyond a predetermined threshold, to increase its chances of successful completion of proof-of-work.

The IoT devices may be smart meters located throughout an energy network, RFID readers on logistics networks, weather sensors in crowd-sourced weather monitoring networks, etc. The data fields in the measurements blocks may be energy, voltage, current readings, products codes, temperature, wind speed, irradiance, etc. The EMBs may be the latest measurement block of an IoT device and/or measurement blocks within a period of time T (i.e., 24 hours). The D2N may include a last number of bits of the data or a hash of the data.

FIG. 1 illustrates a logic diagram 100 of determining a proof-of-work for a device using a specified nonce according to example embodiments. Referring to FIG. 1, the example includes various blocks including measurement blocks (MBs) 122 and 126-138 which are stored on the blockchain along with a contract block 124. A most recent block is block 138. In this example, two different IoT devices have been computing blocks, IoT ID1 122 and IoT ID2 126. Assuming IoT device ID1 wants to compute a proof-of-work for a next block (not shown), the eligible measurement blocks (EMBs) used in this example are 134 and 138 based on a time constraint or time variable which dictated the requirement to use those blocks (i.e., blocks from last N number of hours as eligible blocks). In this example, the D2N transformation includes 4 least significant bits (LSBs) based on the allowed data 6757 and 1654 derived from the EMBs. The bits are 0101 and 0110 and the ID1 IoT device will attempt to solve the 'crypto-puzzle' (PoW) with the above selected nonce values of the EMBs. If the ID1 device succeeds with nonce 0101, the nonce reference block (NRB)=MB-ID3 IoT ID1 134. The operations are outlined in the flow diagram of operations 142 through 148 which are associated with certain MBs. For example, using the hash of the previous block MB ID4 IoT ID1 in operation 142, determining the hash 144 of the current block which is contract ID2 152, and using the nonce of 0101 from MB-ID3 IoT ID1 146, the hash will be based on that block 134 as the nonce reference block (NRB) 148.

Figure 2:
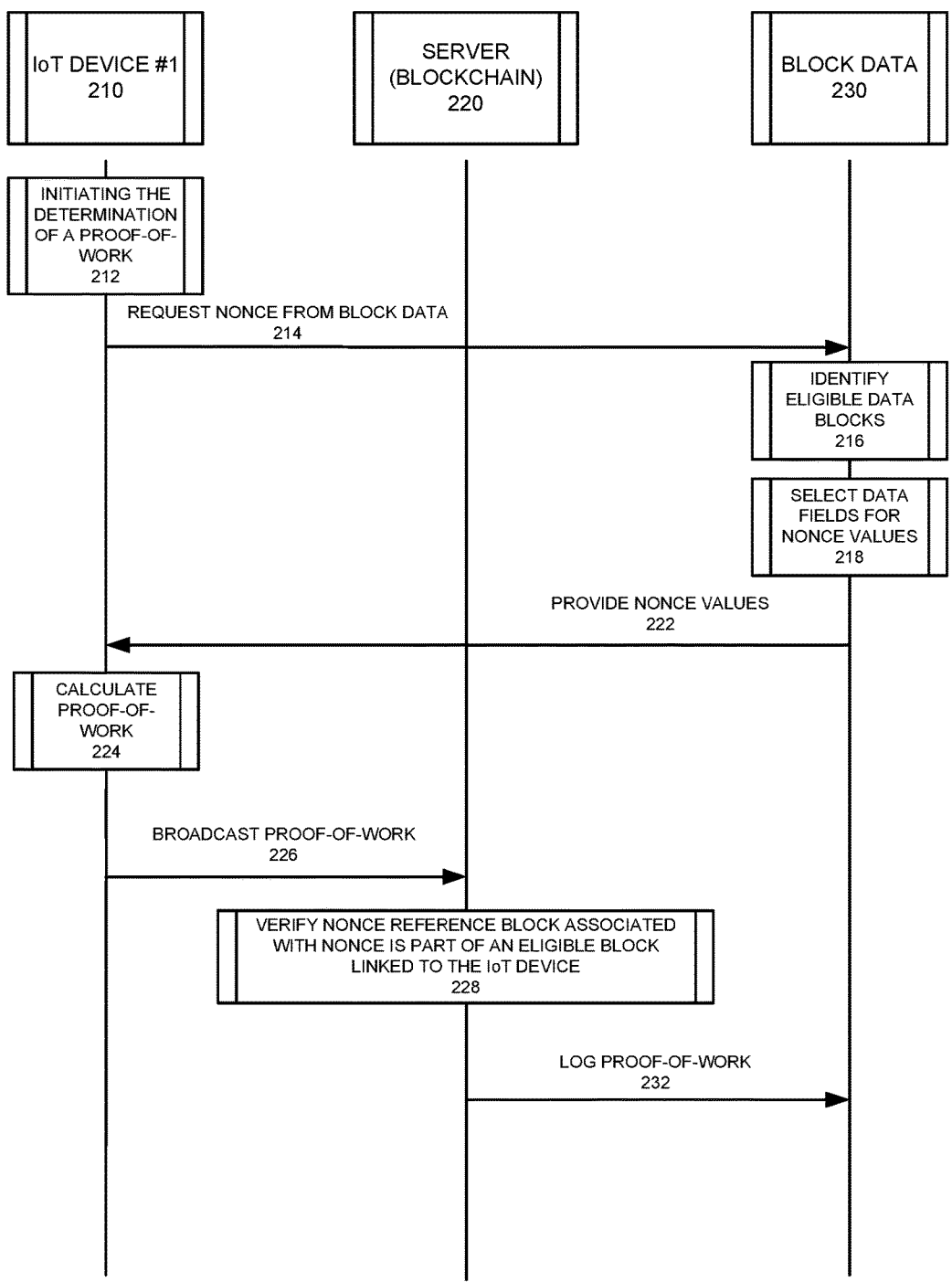
FIG. 2 illustrates a system signaling diagram of a blockchain proof-of-work procedure according to example embodiments.

FIG. 2 illustrates a system signaling diagram of a blockchain proof-of-work procedure according to example embodiments. Referring to FIG. 2, the diagram 200 includes a IoT device 210 as one of many devices which may be operating on the network. The server 220 represents a facilitator of the blockchain data or the blockchain network. The block data 230 may be stored separately, locally as part of a memory of the server 220 and/or the IoT device 210. In operation, when an IoT device is attempting to initiate a proof-of-work determination 212, the nonce value 214 that will be used is successfully identified, retrieved and provided from the block data of the EMBs. The block data must be examined to identify eligible data blocks 216 from which to select the nonce values 218. The nonce values are provided 222 to the IoT device so the proof-of-work can be determined or calculated 224. The completed proof-of-work can then be broadcasted 226 to the blockchain 220 which verifies 228 the nonce reference block associated with the nonce is actually part of an eligible block (i.e., 24 hour time window, etc.), and that the eligible block belongs to the IoT device calculating the nonce. Once the determination is made, the proof-of-work is logged 232 for future reference as part of the blockchain.

Figure 3A:
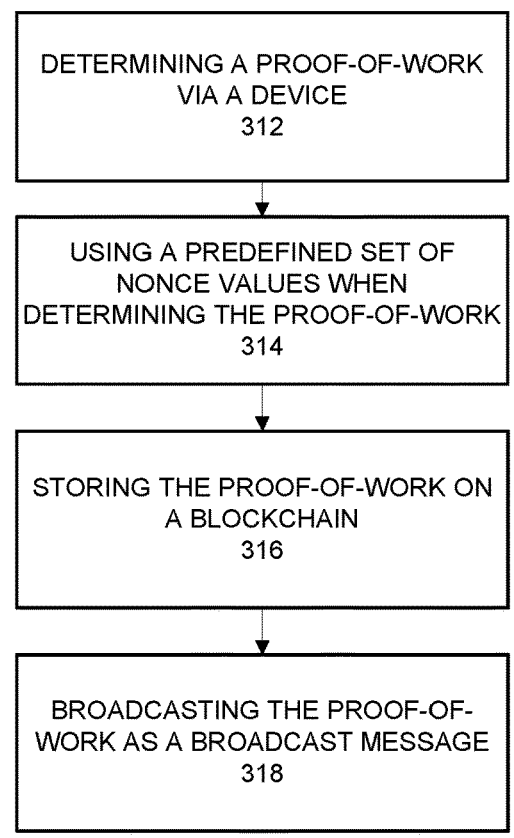
FIG. 3A illustrates a flow diagram of an example method of verification and content exchange according to example embodiments.

FIG. 3A illustrates a flow diagram 300 of an example method of verification and content exchange according to example embodiments. Referring to FIG. 3A, one example method of operation may include one or more of determining a proof-of-work via a device 312 using a predefined set of nonce values when determining the proof-of-work 314, and storing the proof-of-work on a blockchain 316. The proof-of-work may also be broadcast as a broadcast message 318. The device may be an Internet of Things (IoT) compatible device. The method may also include retrieving the predefined set of nonce values from eligible measurement blocks (EMBs) associated with the device, determining the predefined set of nonce values from predefined data fields of the EMBs, and the broadcast message may include a nonce reference block (NRB) used to derive the nonce values. The method may further include verifying the NRB is part of the EMBs for the device. The proof-of-work may be stored in a smart contract of a blockchain.

Figure 3B:
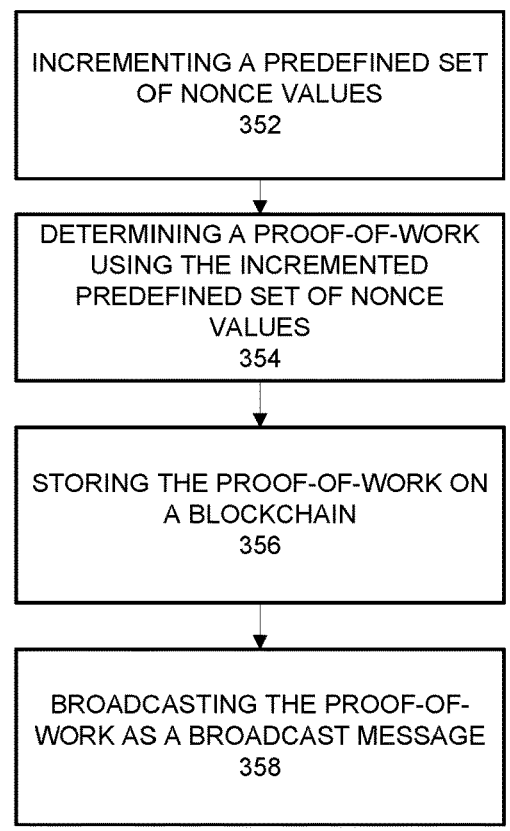
FIG. 3B illustrates another flow diagram of another example method of operation according to example embodiments.

FIG. 3B illustrates a flow diagram 350 of an example method of verification and content exchange according to example embodiments. Referring to FIG. 3B, another example method of operation may include one or more of incrementing a predefined set of nonce values 352, determining the proof-of-work using the incremented predefined set of nonce values 354, storing the proof-of-work on a blockchain 356, and broadcasting the proof-of-work as a broadcast message 358. In this example, incrementing the nonce values may include a pre-screening to identify validity based on a key block, if the validity is uncertain, the nonce is incremented and updates are broadcasted to other peer nodes in the network. The increment may include a predefined increment value which is known to and/or used by privileged parties.

A Proof-of-Work (PoW) definition in this example can apply to blockchain configurations, such ones where a miner is calculating a hash. In one embodiment, customized nonce values are used in calculating this hash and a typical miner computation is avoided due to the customized nonce values. A valid set of EMBs may be used by applying a D2N transformation on the data, and a set of possible nonce values are then generated. The valid nonce for a PoW belongs to a subset for that instance. The EMBs are measurement blocks that satisfy given criteria, such as what is generated in a period of time and which are agreed to by network participants. EMBs are similar to a blockchain block that has been completed but record measurement data from IOT devices. These blocks qualify to become EMBs based on the selection criteria. Among the EMBs, the one which provides a valid nonce value becomes the NRB. Nonce values are derived by applying D2N transformations on the data fields of the NRB. Any data fields of an EMB which are compatible for D2N transformation can be used.

Another example includes EMBs that are among the last number of blocks as opposed to just the last blocks in a certain time frame. The D2N transformation takes the data stored in the EMBs and transforms it into possible nonce values. Depending on the domain, suitable transformation functions are defined to convert the measurement data to a short set of bits. For example, the last 'K' bits of the data may include eligibility criteria for EMBs. The data fields used for D2N transformations and D2N transformation functions can be defined based on the domain and can be agreed upon by the network participants. Each IoT device may have a number of possible values for a nonce, such as 24, which helps in restricting the amount of computational power that each device needs to compute the PoW. However, at an aggregate network level, assuming 1 million IoT devices are operating, the total set of choices for the nonce is 24 million.

In one embodiment, all computations and storage occur on the IoT devices, and thus each IoT device maintains a record of the distributed ledger and has computational power to derive the nonce values. IoT devices add NRB ID data to the block that is being added to the blockchain. Verification of the NRB can involve a number of operations, such as two operations, including the device that submitted the block actually owning the NRB and a nonce value being derived from the NRB as a valid proof of work. In the example of FIG. 1, the ID IoT device 122 attempts to compute a PoW, and it is assumed that ID3 134 and ID4 138 are EMBs based on the time constraint requirement (i.e., last 24 hours, etc.). MB-ID3 134 and MB-ID4 138 are the EMBs based on a recent time frame requirement and MB-ID1 and MB-ID2 do not qualify in this example.

Payment contract ID2 152 represents a new transaction which needs to be added to the blockchain. In one example, D2N transformation: 4 LSBs: 0101, 0110, includes two values which represent two possible values for a nonce. Only one (0101) qualifies to become a nonce as it solves the crypto-puzzle PoW that must be satisfied. Within a given time window, only a fraction of nodes will be able to solve the puzzle. A set of 'early' puzzle solvers is not known and changes from one PoW to the next PoW, and hence acquiring a smaller group does not affect correctness. To control the puzzle complexity in comparison with a network delay, puzzle complexity can be changed by adjusting a nonce requirement. In addition, the size of the EMBs can change as well as the variations of the D2N. For large networks with large communication delays, the complexity could be set such that nodes might wait for significantly different incoming EMBs to solve the puzzle. This will ensure enough time will be taken to solve the puzzle in comparison with network delay and reduce the branching of the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
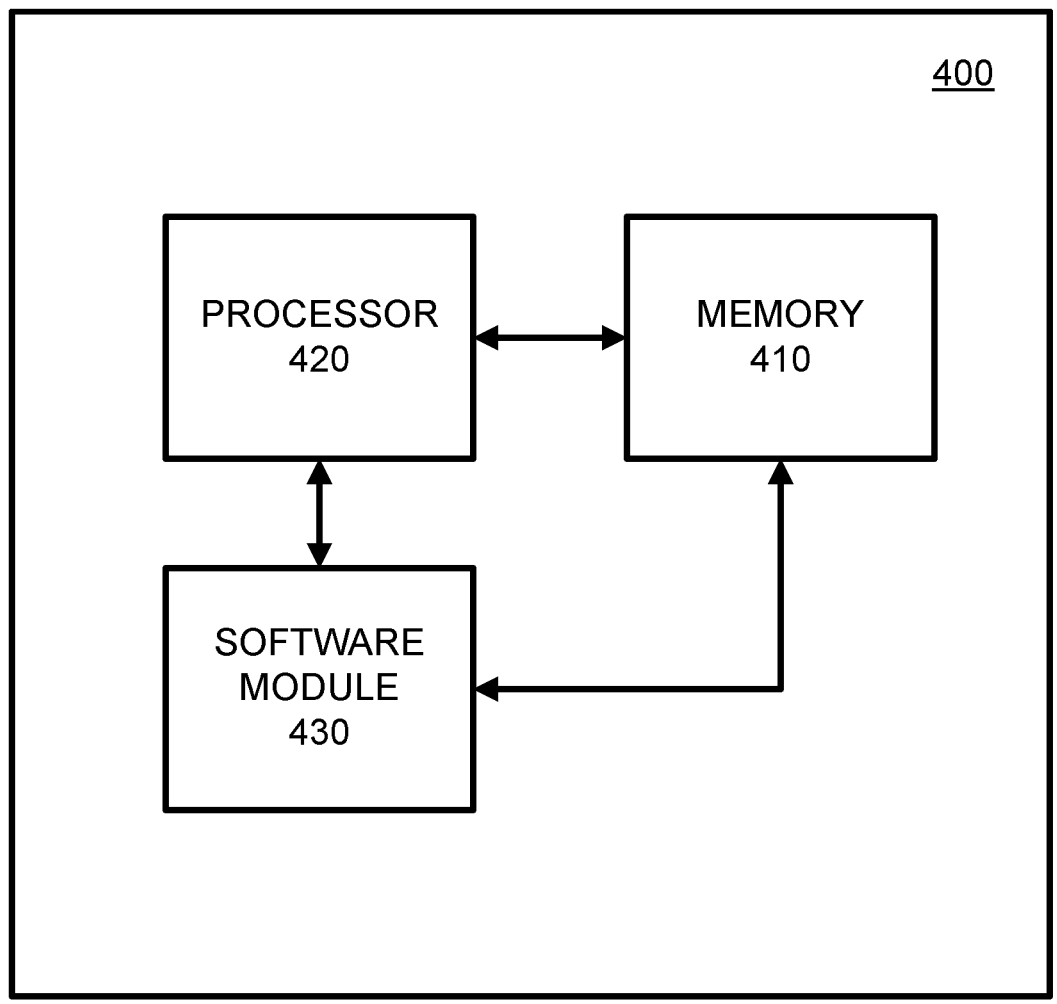
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   retrieving, via a device, a predefined set of nonce values that are derived based on predefined data to nonce transformations, obtained over a predefined period of time, on predefined data fields of eligible measurement blocks (EMBs) that are subset of measurement blocks associated with the device on a blockchain;
   calculating, via the device, a proof-of-work using the predefined set of nonce values;
   storing, via the device, the proof-of-work on the blockchain; and
   broadcasting, via the device, and to the blockchain, the proof-of-work as a broadcast message.

2. The method of claim 1, wherein the device is an Internet of Things (IoT) compatible device.

3. The method of claim 1, further comprising:
   determining the predefined set of nonce values from predefined data fields of the EMBs.

4. The method of claim 1, wherein the broadcast message comprises:
   a nonce reference block (NRB) used to derive the nonce values, wherein the NRB references one or more of the EMBs used to obtain the nonce values.

5. The method of claim 4, further comprising:
   verifying that the NRB is part of the EMBs for the device.

6. The method of claim 1, wherein the proof-of-work is stored in a smart contract.

7. An apparatus, comprising:
a processor configured to:
retrieve a predefined set of nonce values that are derived based on predefined data to nonce transformations, obtained over a predefined period of time, on predefined data fields of eligible measurement blocks (EMBs) that are subset of measurement blocks associated with the device on a blockchain;
determine a proof-of-work using the predefined set of nonce values;
store the proof-of-work on a blockchain; and
cause the proof-of-work to be broadcast, as a broadcast message, to the blockchain.

8. The apparatus of claim 7, wherein the device is an Internet of Things (IoT) compatible device.

9. The apparatus of claim 7, wherein the processor is further configured to:
determine the predefined set of nonce values from predefined data fields of the EMBs.

10. The apparatus of claim 7, wherein the broadcast message comprises:
a nonce reference block (NRB) used to derive the nonce values, wherein the NRB references one or more of the EMBs used to obtain the nonce values.

11. The apparatus of claim 10, wherein the processor is further configured to:
verify that the NRB is part of the EMBs for the device.

12. The apparatus of claim 7, wherein the proof-of-work is stored in a smart contract.

13. A non-transitory computer readable medium configured to store at least one instruction that when executed by a processor of a device implementing a blockchain causes the processor to perform:
retrieving, via a device, a predefined set of nonce values that are derived based on predefined data to nonce transformations, obtained over a predefined period of time, on predefined data fields of eligible measurement blocks (EMBs) that are subset of measurement blocks associated with the device on a blockchain;
calculating, via the device, a proof-of-work using the predefined set of nonce values;
storing the proof-of-work on a blockchain; and
broadcasting the proof-of-work as a broadcast message to the blockchain.

14. The non-transitory computer readable medium of claim 13, wherein the device is an Internet of Things (IoT) compatible device.

15. The non-transitory computer readable medium of claim 13, further configured to store at least one instruction that when executed by the processor causes the processor to perform:
determining the predefined set of nonce values from predefined data fields of the EMBs.

16. The non-transitory computer readable medium of claim 13, wherein the broadcast message comprises:
a nonce reference block (NRB) used to derive the nonce values, wherein the NRB references one or more of the EMBs used to obtain the nonce values.

17. The non-transitory computer readable medium of claim 16, further configured to store at least one instruction that when executed by the processor causes the processor to perform:
verifying that the NRB is part of the EMBs for the device, and wherein the proof-of-work is stored in a smart contract.

\* \* \* \* \*